(12) United States Patent
Kalle

(10) Patent No.: US 8,904,540 B1
(45) Date of Patent: Dec. 2, 2014

(54) METHOD AND APPARATUS FOR EVALUATING HYGIENE OF A COMPUTER

(75) Inventor: Chandrasekhar Kalle, Santa Clara, CA (US)

(73) Assignee: Symantec Corporation, Mountain View, CA (US)

( * ) Notice: Subject to any disclaimer, the term of this patent is extended or adjusted under 35 U.S.C. 154(b) by 1410 days.

(21) Appl. No.: 12/337,587

(22) Filed: Dec. 17, 2008

(51) Int. Cl.
*G06F 12/14* (2006.01)

(52) U.S. Cl.
USPC .................................................. 726/25

(58) Field of Classification Search
USPC .................................................. 726/25
See application file for complete search history.

(56) References Cited

U.S. PATENT DOCUMENTS

| | | | |
|---|---|---|---|
| 7,448,084 B1* | 11/2008 | Apap et al. | 726/24 |
| 2005/0044418 A1* | 2/2005 | Miliefsky | 713/201 |
| 2006/0020814 A1* | 1/2006 | Lieblich et al. | 713/182 |
| 2008/0028470 A1* | 1/2008 | Remington et al. | 726/25 |
| 2008/0172741 A1* | 7/2008 | Reumann et al. | 726/23 |

* cited by examiner

*Primary Examiner* — Ellen Tran
(74) *Attorney, Agent, or Firm* — Wilmer Cutler Pickering Hale and Dorr LLP

(57) ABSTRACT

A method and apparatus for evaluating hygiene of a computer are described. In some examples, attributes of an operating system on the computer are analyzed to assign values to operating system state variables. Attributes of application software installed on the computer are analyzed to assign values to application software state variables. Weights are assigned to the operating system state variables and the application software state variables based on the respective values thereof. A hygiene rating for the computer is determined based on the weights, the hygiene rating indicative of the propensity of the computer to attract malware.

20 Claims, 2 Drawing Sheets

100

METHOD AND APPARATUS FOR EVALUATING HYGIENE OF A COMPUTER

BACKGROUND OF THE INVENTION

1. Field of the Invention

The present invention relates generally to computers. More particularly, the present invention relates to a method and apparatus for evaluating hygiene of a computer.

2. Description of the Related Art

Consumers and businesses increasingly rely on computers to store sensitive data. Consequently, malicious programmers seem to continually increase their efforts to gain illegitimate control and access to others' computers and sensitive data. Such malicious programmers continue to create viruses, Trojan horses, worms, and like type programs meant to compromise computer systems and sensitive data belonging to others. These malicious programs are often generally referred to as "malware".

Security software companies are combating the growing tide of malware by developing various client security products, such as anti-virus, anti-spyware, or other types of anti-malware products. Some security products may be designed to make use of metrics that characterize the propensity of particular computers to attract malware. Such metrics may be referred to as a computer's "hygiene". Hygiene ratings can be used in reputation-based security products that automatically manage security and performance of a user's computer by using the knowledge gained from "healthy" computers of other users. The ability to accurately determine hygiene of users' computers can be crucial to the operation of security products.

Accordingly, there exists a need in the art for a method and apparatus for evaluating hygiene of a computer.

SUMMARY OF THE INVENTION

Aspects of the invention relate to evaluating hygiene of a computer. Attributes of an operating system on the computer are analyzed to assign values to operating system state variables. Attributes of application software installed on the computer are analyzed to assign values to application software state variables. Weights are assigned to the operating system state variables and the application software state variables based on the respective values thereof. A hygiene rating for the computer is determined based on the weights, the hygiene rating indicative of the propensity of the computer to attract malware.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
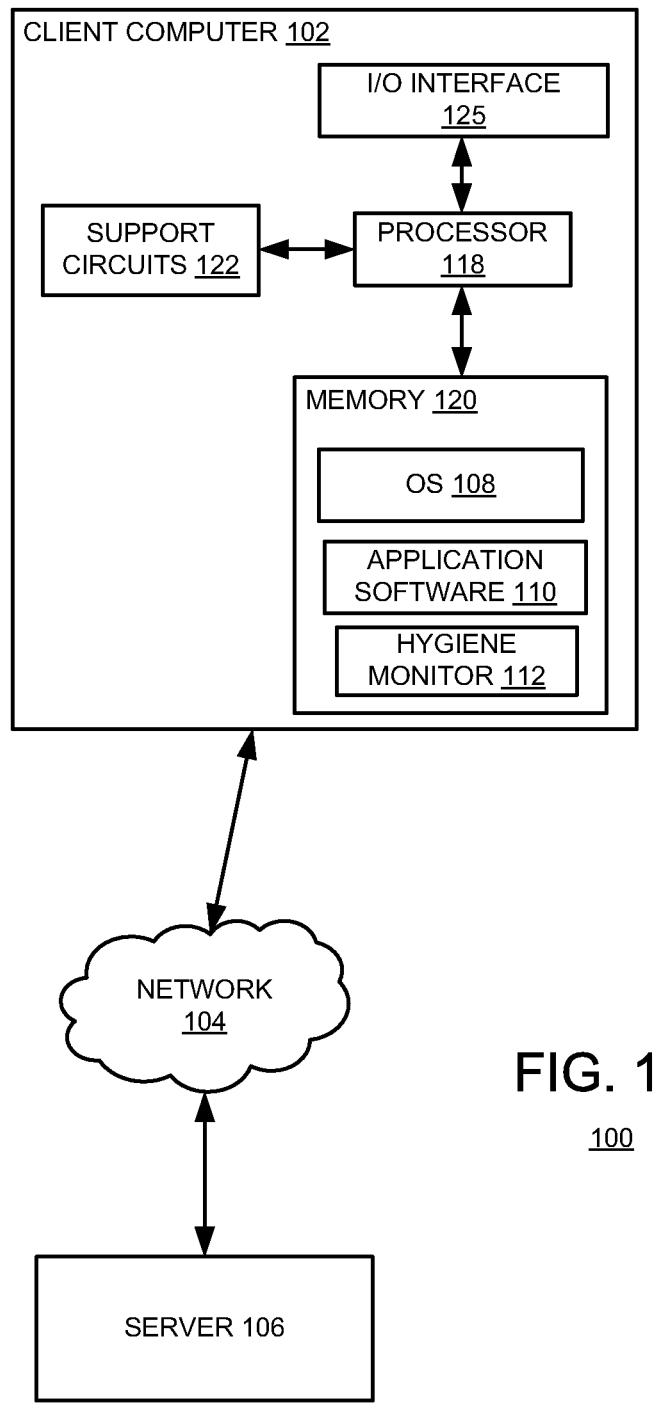
FIG. 1 is a block depicting an exemplary embodiment of a computer system in accordance with one or more aspects of the invention.

FIG. 1 is a block diagram depicting an exemplary embodiment of a computer system 100 in accordance with one or more aspects of the invention. The system 100 includes a client computer 102, a network 104, and a server 106. The network 104 comprises a communication system that connects computer systems by wire, cable, fiber optic, and/or wireless links facilitated by various types of well-known network elements, such as hubs, switches, routers, and the like. In particular, the client computer 102 may communicate with the server 106 or other external servers/computers via the network 104. The network 104 may employ various well-known protocols to communicate information. For example, the network 104 may employ internet protocol (IP), transmission control protocol (TCP), and the like for the transmission of packets. The network 104 may comprise part of a wide area network (WAN), such as the Internet, and/or all or part of a local area network (LAN).

The client computer 102 illustratively includes a processor 118, a memory 120, various support circuits 122, an I/O interface 125. The processor 118 may include one or more microprocessors known in the art. The support circuits 122 for the processor 118 include conventional cache, power supplies, clock circuits, data registers, I/O interfaces, and the like. The I/O interface 125 may be configured for communication with the network 104. The memory 120 may include one or more of the following random access memory, read only memory, magneto-resistive read/write memory, optical read/write memory, cache memory, magnetic read/write memory, and the like.

The client computer 102 includes an operating system (OS) 108, application software 110, and a hygiene monitor 112. The operating system 108 may be any type of operating system known in the art, such as any MICROSOFT WINDOWS, APPLE MACINTOSH, or like type operating systems known in the art. The application software 110 may include various programs, such as an Internet browser, security tools (e.g., antivirus, anti-spyware, Internet protection, etc.), performance tools (e.g., registry monitors, file system monitors, etc.), and the like. The hygiene monitor 112 is configured to analyze the client computer 102 to evaluate its hygiene.

In some embodiments, the hygiene analyzer 112 analyzes attributes of the operating system 108 to assign values to operating system state variables. Exemplary operating system attributes include one or more of: identity attributes (e.g., name, type, version, etc.), security attributes (e.g., whether any number of security features are enabled/disabled, such as firewall, antivirus, automatic updates, etc.), network attributes (e.g., open TCP ports, file/printer sharing, etc.), file system attributes (e.g., degree of file clutter, fragments, etc.), system configuration attributes, and the like. The system configuration attributes may include one or more of: registry attributes (e.g., degree of registry clutter, unused entries, etc.), update service attributes (e.g., whether automatic updates is enabled), and the like. The hygiene analyzer 112 records the values of the attributes being analyzed into variables for later processing (referred to as operating system state variables).

In some embodiments, the hygiene analyzer 112 analyzes attributes of the application software 110 to assign values to application software state variables. Exemplary application software attributes include one or more of: software installation rate (e.g., rate new programs are being installed), software patch status (e.g., whether particular programs are up-to-date), security software tool status (e.g., whether antivirus, anti-malware, etc. are installed and up-to-date), performance management tool status (e.g., whether system monitor, registry monitor, and like type programs are installed), software digital signature status (e.g., whether installed programs are digitally signed by a trusted source), and the like. The application software 110 may include an Internet browser, and the application software attributes may include one or more of: browser security attributes (e.g., browser security level, whether the browser is remembering passwords, etc.), downloaded file attributes (e.g., types and sources of files), and the like.

The hygiene analyzer 112 is configured to assign weights to the operating system state variables and the application software state variables based on the respective values thereof. The hygiene analyzer 112 can then determine a hygiene rating for the client computer 102 based on the weights. The hygiene rating is indicative of the propensity of the computer to attract malware. In some embodiments, the hygiene analyzer 112 may send the hygiene rating from the client computer 102 to a server (e.g., the server 106) over the network 104. The hygiene rating can be used as a baseline security profile for the client computer 102, which can be used in reputation-based security services and products. Exemplary analyses performed by the hygiene analyzer 112 are described below.

The hygiene analyzer 112 may determine what operating system is running on the client computer 102 (e.g., OS identity attributes). For example, MICROSOFT WINDOWS VISTA-64 may receive a more positive weight than an older, less secure operating system, such as MICROSOFT WINDOWS 95.

The hygiene analyzer 112 may determine whether the update service in the operating system 108 is turned on (system configuration attributes). A more positive weight is assigned if the update service is turned on than if the update service is turned off. If the update service is not turned on, the operating system 108 may not have the latest patches and security updates, which makes the client computer 102 more vulnerable to malware attacks.

The hygiene analyzer 112 may determine how an update service in the operating system 108 is configured (system configuration attributes). For example, is the update service configured to "automatically download and install updates" or "just download and notify of the availability of updates," with a more positive weight being assigned to the former than the latter.

The hygiene analyzer 112 may determine the average uptime of the operating system 108. Lesser uptime would be assigned a more positive weight than longer uptime, since the longer the operating system 108 is operational, the more vulnerable to malware the client computer 102 may become.

The hygiene analyzer 112 may determine the rate new software programs are being installed on the client computer 102. A lower rate of new software programs can be assigned a more positive weight than a higher rate of new software installation. A higher rate of new software installation may make the client computer 102 more vulnerable to malware. The hygiene analyzer 112 may also determine the patch status of some pre-defined software programs deemed as having more risk, such as Internet browsers, e-mail clients, instant messaging clients, peer-to-peer software, and the like. More un-patched applications yields a more negative weight than less un-patched applications.

The hygiene analyzer 112 may determine whether any of the security features of the operating system 108 or other security software are disabled. For example, more disabling of security features yields a more negative weight than less disabling of security features. If security features are disabled, this may result in a gap in security coverage for the client computer 102.

The hygiene analyzer 112 may determine whether any of security tools are present and enabled in the system. More security tools yields a more positive weight than less security tools. More security tools indicate that the user may be more careful and aware of security issues and hence the client computer 102 is less vulnerable to malware attacks.

The hygiene analyzer 112 may determine whether any performance management tools are installed on the client computer 102. The present of one or more performance management tools (e.g., registry cleaners, disk cleaners, etc.) may be assigned a more positive weight than the absence of performance management tools. The presence of performance management tools indicates that the user generally cares about maintaining his or her system.

The hygiene analyzer 112 may determine how cluttered the system configuration files are, such as the registry file in a MICROSOFT WINDOWS operating system. Less clutter results in a more positive weight than more clutter.

The hygiene analyzer 112 may determine the clutter of the file system. For example, the more clutter in particular file system folders, such as the Internet cache, the home folder, the desktop, and the like, the more negative weight that is assigned.

The hygiene analyzer 112 may determine whether there has been any suspicious network activity within a particular period of time. More suspicious network activity is assigned a more negative weight than less suspicious network activity. For example, the hygiene analyzer 112 may analyze the average time spent on risky applications, such as Internet browsers, e-mail clients, peer-to-peer software, and the like. The more time such risky applications are running, the more negative weight is assigned. The hygiene analyzer 112 may determine if any risky websites have been accessed within a particular period of time, such as pornography websites, download websites, and the like. The more risky websites access, the more negative weight is assigned. If the user has been accessing risky websites, the client computer 102 may be more vulnerable to malware attacks.

The hygiene analyzer 112 may determine whether any unsigned applications have been installed and executed. Application programs may be digitally signed and capable of being verified by a trusted source as being trustworthy. If the user has chosen to install unsigned applications, then a more negative weight can be assigned. Unsigned applications may indicate that a user is not security-minded.

The hygiene analyzer 112 may determine whether the Internet browser is configured to remember passwords. Remembering passwords results in assignment of a more negative weight than not remembering passwords. Security conscience users may use more secure storage for passwords than an Internet browser.

The hygiene analyzer 112 may determine whether files have been downloaded from risky websites. For example, whether mp3 or other music files have been downloaded from free music websites. Risky downloads may result in assignment of a more negative weight.

Those skilled in the art will appreciate that the hygiene analyzer 112 may perform various other analyses of attributes and assign positive and negative weights based on the values of such attributes in addition to those described above. In general, an attribute is analyzed and a value assigned to a variable. A weight is then assigned to the variable based on its value. The weight contributes to the overall hygiene rating determined for the client computer 102. The particular weights assigned to the particular values of particular attributes may be defined by the distributor of the hygiene analyzer 112. The weights may be periodically adjusted. For example, the hygiene analyzer 112 may periodically download new weights through the network 104 (e.g., from the server 106). The weights may be adjusted to reflect the importance of some attributes versus other attributes based on current trends in computer security and malware.

In some embodiments, the hygiene monitor 112 comprises software configured for execution by the processor 118 to cause the client computer 102 to evaluate hygiene. While the hygiene monitory 112 is described as being software executed by a computer, it is to be understood that the hygiene monitory 112 may be implemented using hardware (e.g., via an application specific integrated circuit (ASIC) or programmable logic device (PLD), or a combination of hardware and software.

Figure 2:
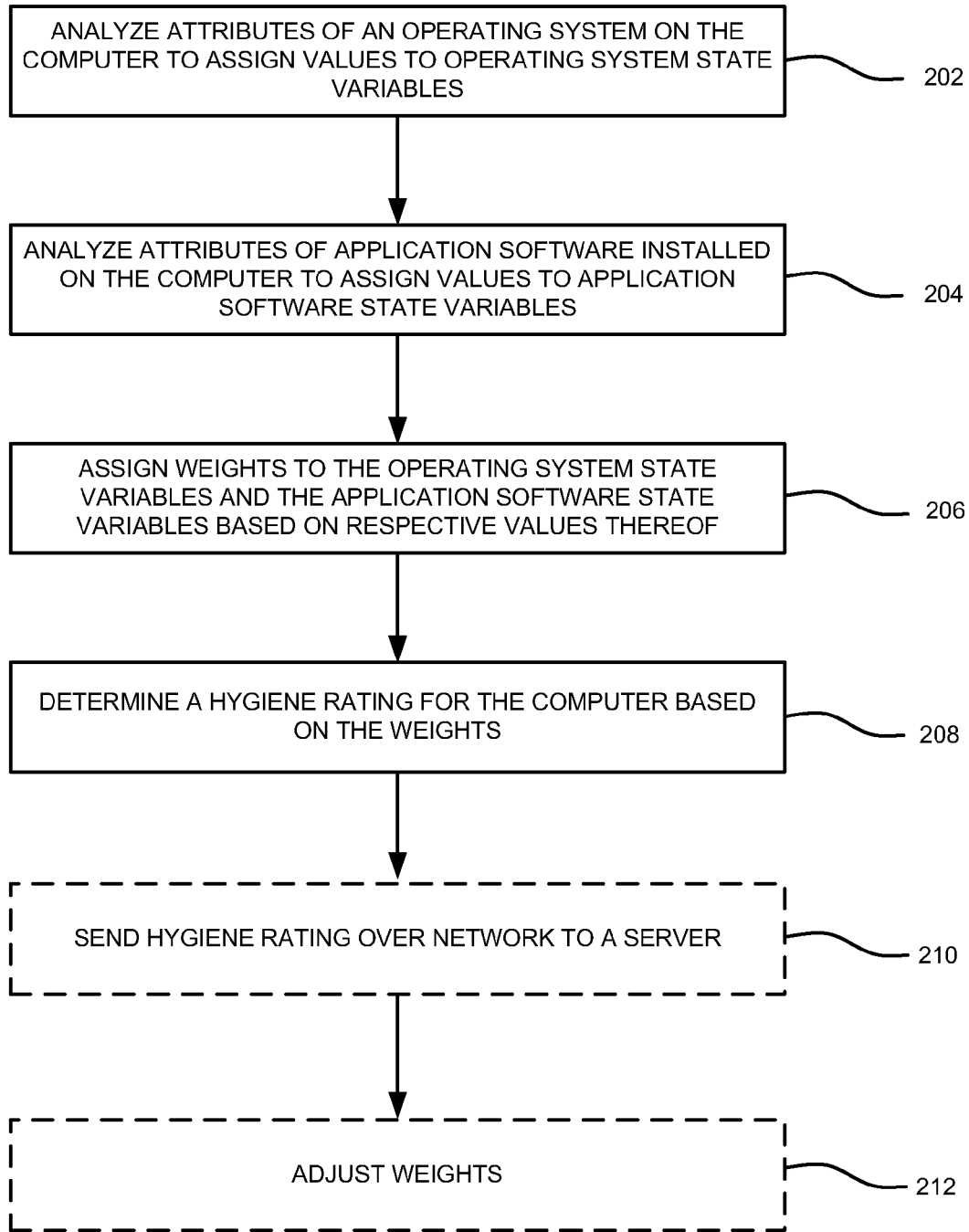
FIG. 2 is a flow diagram depicting a method of evaluating hygiene of a computer according to some embodiments of the invention.

FIG. 2 is a flow diagram depicting a method 200 of evaluating hygiene of a computer according to some embodiments of the invention. At step 202, attributes of an operating system on the computer are analyzed to assign values to operating system state variables. At step 204, attributes of application software installed on the computer are analyzed to assign values to application software state variables. At step 206, weights are assigned to the operating system state variables and the application software state variables based on the respective values thereof. At step 208, a hygiene rating for the computer is determined based on the weights, the hygiene rating indicative of the propensity of the computer to attract malware. At optional step 210, the hygiene rating can be sent from the computer to a server over a network. The server can use the hygiene rating as a baseline security profile for use in reputation-based security services, for example. At optional step 212, the weights assigned to the operating system state variables and the application software state variables can be adjusted.

Aspects of the methods described above may be implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer implemented method of evaluating hygiene of a computer, the method comprising:
analyzing attributes of an operating system on the computer to assign values to operating system state variables, wherein the attributes of the operating system include a level of clutter of at least one of (a) system configuration files associated with the operating system and (b) files in a file system associated with the operating system, and wherein the values assigned to the operating system state variables associated with the level of clutter measure at least one of (i) a count of system configuration keys in the system configuration files, and (ii) a count of files and directories in the file system;

analyzing attributes of application software installed on the computer to assign values to application software state variables, wherein the application software includes an Internet browser, wherein the attributes of the application software include downloaded file attributes, wherein the downloaded file attributes include at least one of a file type and a file source, and wherein the values assigned to the application software state variables associated with the downloaded file attributes measure whether an associated linked file downloaded by a user within a web page represents a security risk;

assigning weights to the operating system state variables and the application software state variables based on the respective values thereof; and determining a hygiene rating for the computer based on the weights, the hygiene rating indicative of the propensity of the computer to attract malware.

2. The method of claim 1, further comprising:
sending the hygiene rating for the computer over a network to a server as a baseline security profile for the computer.

3. The method of claim 1, wherein the attributes of the operating system on the computer comprise at least one of: identity attributes, security attributes, network attributes, file system attributes, and system configuration attributes.

4. The method of claim 3, wherein the system configuration attributes include registry attributes and update service attributes.

5. The method of claim 1, wherein the attributes of the application software comprise at least one of: software installation rate, software patch status, security software tool status, performance management tool status, and software digital signature status.

6. The method of claim 1, further comprising:
periodically adjusting the weights assigned to the operating system state variables and the application software state variables to reflect an updated importance of the attributes of the operating system relative to the attributes of the application software based at least in part on current computer security trends.

7. The method of claim 1, wherein the values assigned to the application software state variables measure an assessment of a browser security level and an indicator of whether the Internet browser is configured to remember passwords.

8. An apparatus for evaluating hygiene of a computer, the apparatus comprising:
means for analyzing attributes of an operating system on the computer to assign values to operating system state variables, wherein the attributes of the operating system include a level of clutter of at least one of (a) system configuration files associated with the operating system and (b) files in a file system associated with the operating system, and wherein the values assigned to the operating system state variables associated with the level of clutter measure at least one of (i) a number of system configuration keys in the system configuration files, and (ii) a number of files and directories in the file system;

means for analyzing attributes of application software installed on the computer to assign values to application software state variables, wherein if the application software includes an Internet browser, wherein the attributes of the application software include downloaded file attributes, wherein the downloaded file attributes include at least one of a file type and a file source, and wherein the values assigned to the application software state variables associated with the downloaded file attributes measure whether an associated linked file downloaded by a user within a web page represents a security risk;

means for assigning weights to the operating system state variables and the application software state variables based on the respective values thereof; and means for determining a hygiene rating for the computer based on the weights, the hygiene rating indicative of the propensity of the computer to attract malware.

9. The apparatus of claim 8, further comprising:

means for sending the hygiene rating from the computer over a network to a server as a baseline security profile for the computer.

10. The apparatus of claim 8, wherein the attributes of the operating system on the computer comprise at least one of: identity attributes, security attributes, network attributes, file system attributes, and system configuration attributes.

11. The apparatus of claim 10, wherein the system configuration attributes include registry attributes and update service attributes.

12. The apparatus of claim 8, wherein the attributes of the application software comprise at least one of: software installation rate, software patch status, security software tool status, performance management tool status, and software digital signature status.

13. The apparatus of claim 8, further comprising:

means for periodically adjusting the weights assigned to the operating system state variables and the application software state variables to reflect an updated importance of the attributes of the operating system relative to the attributes of the application software based at least in part on current computer security trends.

14. The apparatus of claim 8, wherein the values assigned to the application software state variables measure an assessment of a browser security level and an indicator of whether the Internet browser is configured to remember passwords.

15. A non-transitory computer readable storage medium having instructions stored thereon that when executed by a processor cause the processor to perform a method of evaluating hygiene of a computer, comprising:

analyzing attributes of an operating system on the computer to assign values to operating system state variables, wherein the attributes of the operating system include a level of clutter of at least one of (a) system configuration files associated with the operating system and (b) files in a file system associated with the operating system, and wherein the values assigned to the operating system state variables associated with the level of clutter measure at least one of (i) a number of system configuration keys in the system configuration files, and (ii) a number of files and directories in the file system;

analyzing attributes of application software installed on the computer to assign values to application software state variables, wherein the application software includes an Internet browser, wherein the attributes of the application software include downloaded file attributes, wherein the downloaded file attributes include at least one of a file type and a file source, and wherein the values assigned to the application software state variables associated with the downloaded file attributes measure whether an associated linked file downloaded by a user within a web page represents a security risk;

assigning weights to the operating system state variables and the application software state variables based on the respective values thereof; and determining a hygiene rating for the computer based on the weights, the hygiene rating indicative of the propensity of the computer to attract malware.

16. The non-transitory computer readable storage medium of claim 15, wherein the instructions further cause the processor to further perform the method comprising:

sending the hygiene rating from the computer over a network to a server as a baseline security profile for the computer.

17. The non-transitory computer readable storage medium of claim 15, wherein the attributes of the operating system on the computer comprise at least one of: identity attributes, security attributes, network attributes, file system attributes, and system configuration attributes.

18. The non-transitory computer readable storage medium of claim 17, wherein the system configuration attributes include registry attributes and update service attributes.

19. The non-transitory computer readable storage medium of claim 15, wherein the attributes of the application software comprise at least one of: software installation rate, software patch status, security software tool status, performance management tool status, and software digital signature status.

20. The non-transitory computer readable storage medium of claim 15, wherein the values assigned to the application software state variables measure an assessment of a browser security level and an indicator of whether the Internet browser is configured to remember passwords.

* * * * *